United States Patent [19]
Toda

[11] Patent Number: 5,584,559
[45] Date of Patent: Dec. 17, 1996

[54] HEADLAMP FOR A MOTOR VEHICLE

[75] Inventor: Atsushi Toda, Shizuoka, Japan

[73] Assignee: Koito Manufacturing Co., Ltd., Tokyo, Japan

[21] Appl. No.: 287,939

[22] Filed: Aug. 9, 1994

[30] Foreign Application Priority Data

Aug. 12, 1993 [JP] Japan .................... 5-200621

[51] Int. Cl.⁶ .................................... B60Q 1/04
[52] U.S. Cl. .............................. 362/61; 362/80; 362/265
[58] Field of Search ................... 362/61, 80, 66, 362/263, 265, 226, 457, 272, 284

[56] References Cited

U.S. PATENT DOCUMENTS

| | | | |
|---|---|---|---|
| 5,119,275 | 6/1992 | Makita | 362/61 |
| 5,188,444 | 2/1993 | Makita et al. | 362/80 |
| 5,228,766 | 7/1993 | Makita et al. | 362/61 |

*Primary Examiner*—Y. My Quach
*Attorney, Agent, or Firm*—Sughrue, Mion, Zinn, Macpeak & Seas

[57] ABSTRACT

An actuator circuit unit of a discharge-type headlamp is connected through a connector to a discharge bulb located within a lamp body, and is inserted and fastened to a mounting hole of the lamp body with the actuator circuit unit protruding rearward of the lamp body. A connector of an output cord from a ballast circuit unit, which is located near the headlamp, is removably inserted into a connector connection portion attached to the outer surface of the actuator circuit unit. By turning the actuator circuit unit along and within the mounting hole, the unit can be pulled out of the mounting hole. A rotation blocking member (rib), which projects rearward from the rear wall of the lamp body, is provided in the vicinity of the mounting hole. When the actuator circuit unit is turned in the removal direction, the rotation blocking member comes in contact with the connector that has been inserted into the connector connection portion, blocking further turning of the unit. The removal of the actuator circuit unit and bulb exchange are prevented until the output cord is disconnected from the actuator circuit unit and the supply of power to the actuator circuit unit is stopped.

13 Claims, 5 Drawing Sheets

5,584,559

HEADLAMP FOR A MOTOR VEHICLE

BACKGROUND OF THE INVENTION

The present invention relates to a headlamp for a motor vehicle using a discharge bulb as a light source, and more particularly to a headlamp for a motor vehicle in which the degree of safety in removing an actuator circuit unit from a lamp body is improved.

Recently, discharge bulbs have been employed for light sources for headlamps because the bulbs are capable of producing light beams of high intensity and they have a long lifetime. Where a discharge bulb is used as a light source, an actuator circuit for causing the discharge bulb to start its discharge and a ballast circuit for causing the discharge bulb to continue a stable discharge must be provided.

FIG. 1 shows a vehicular headlamp of a type previously proposed. A discharge bulb 2 is inserted into a bulb insertion hole la of a reflector 1. An actuator circuit unit 5 is attached to a circular opening portion 4 of a lamp body 3 into which the bulb is removably inserted. A ballast circuit unit 6, mounted to a car body B, is disposed in the vicinity of the light-on circuit unit 5. The actuator circuit unit 5 is connected to the discharge bulb 2 by way of an output cord 5a and a connector 5b. The actuator circuit unit 5 and the ballast circuit unit 6 are constructed such that an actuator circuit and a ballast circuit are assembled into cases, respectively. The two circuits are connected to each other by an output cord 7. The output cord 7 leads from the ballast circuit unit 6. A connector 8 attached to the end of the output cord 7 is removably attached to a connector connection portion 9 of the actuator circuit unit 5 in a simple manner. Reference numeral 5c designates a tubular extended portion fastened to the actuator circuit unit 5. The forward end part of the tubular extended portion 5c is coupled with the circular opening portion 4 in a bayonet fashion. To remove the actuator circuit unit 5 from the circular opening portion 4, the circuit unit 5 (and the extended portion 5c) are rotated along the inner circumferential edge of the circular opening portion 4 in the removal direction.

When the discharge bulb 2 is turned on, a voltage of 85 V (standard value) is applied to the output cord 7 which connects the actuator circuit unit 5 to the ballast circuit unit 6, the output cord 5a for connecting the discharge bulb 2 to the actuator circuit unit 5, and the connector 5b. If the output cord 7 is removed from the actuator circuit unit 5 or the connector 5b is removed from the discharge bulb 2 while the headlamp is being fed with current, the fail-safe circuitry of the ballast circuit will operate to stop the supply of power to the headlamp after approximately 0.7 sec. However, while the headlamp is being fed with current, if the bulb is removed for some reason, a high voltage of approximately 20 KV is induced in the output cord 5a and the connector 5b at the instant the connector 5b is removed from the discharge bulb 2. This high voltage is very dangerous to an operator and can cause a severe electric shock. When the output cord 7 is removed from the actuator circuit unit 5, a voltage of approximately 400 V is induced in the output cord 7. At this voltage level, the operator will not receive an electrical shock unless the metal conductor of the cord 7 is directly touched. Thus, this voltage is not so dangerous to the operator if care is used.

For these reasons, it is the usual practice in changing a light bulb to turn off the power source to stop the supply of electric power to the actuator circuit unit 5 and the output cord 5a before the actuator circuit unit 5 and the connector 5b are removed.

However, it is possible to turn the actuator circuit unit 5 in its removal direction with respect to the circular opening portion 4 while the bulb is still lit. Therefore, there is the possibility that operator may mistakenly remove the actuator circuit unit 5 and the connector 5b while the bulb is powered. This is very dangerous.

SUMMARY OF THE INVENTION

The present invention was made in view of the foregoing problems accompanying the conventional headlamp. Accordingly, an object of the invention is to provide a headlamp for a motor vehicle having an improved degree of a safety when an operator touches the headlamp. Specifically, the invention provides a headlamp in which, before the bulb can be removed, it is almost impossible to remove an actuator circuit unit from a lamp body of a discharge type unless a connector of an output cord from a ballast circuit unit is removed from the actuator circuit unit.

To achieve the above object, there is provided a headlamp for a motor vehicle in which an actuator circuit unit, which is connected through a connector to a discharge bulb provided as a light source located within a lamp body of the headlamp, is inserted and fastened to a mounting hole of the rear wall of the lamp body in a state such that the actuator circuit unit protrudes rearward of the lamp body, and a connector attached to the end of an output cord extending from a ballast circuit unit located near the headlamp is removably inserted into a connector connection portion attached to the outer surface of the actuator circuit unit, and by turning the actuator circuit unit along and within the mounting hole, the actuator circuit unit can be pulled out of the mounting hole.

The headlamp thus constructed is improved in that a rotation blocking member projecting rearward from the rear wall of the lamp body is provided in the vicinity of the mounting hole. When the actuator circuit unit is turned in the removal direction, the rotation blocking member comes in contact with the connector that has been inserted into the connector connection portion, blocking further turning of the unit.

To exchange an old discharge bulb with a new one, the actuator circuit unit must be pulled out of the mounting hole by turning the actuator circuit unit before the connector for the actuator circuit unit is disconnected from the discharge bulb. When the actuator circuit unit is turned in the removal direction with the output cord from the ballast circuit unit connected to the actuator circuit unit, the connector inserted into the connector insertion portion comes in contact with the rotation blocking member to prohibit further turning of the actuator circuit unit. On the other hand, when the actuator circuit unit is turned in the removal direction after the output cord from the ballast circuit unit has been disconnected from the actuator circuit unit, there is no connector present to contact the rotation blocking member. Accordingly, the actuator circuit unit may be turned smoothly and removed.

DESCRIPTION OF THE PREFERRED EMBODIMENTS

Preferred embodiments of the present invention will be described with reference to the accompanying drawings.

Figure 1:
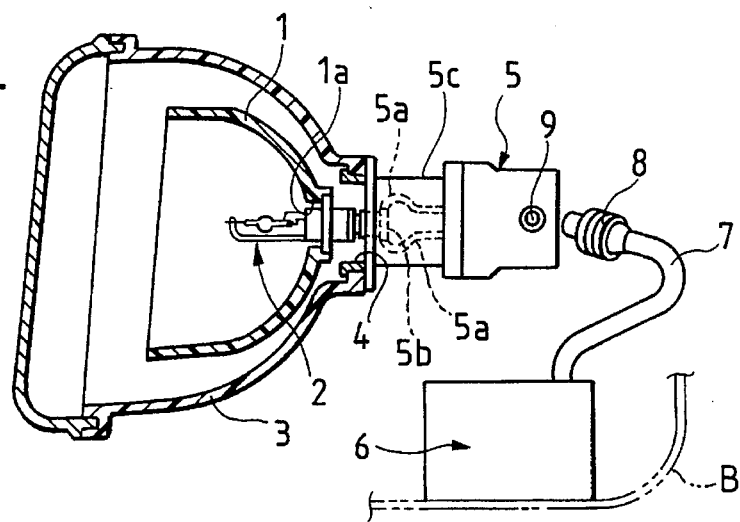
FIG. 1 is a cross-sectional view showing a conventional headlamp.
Figure 2:
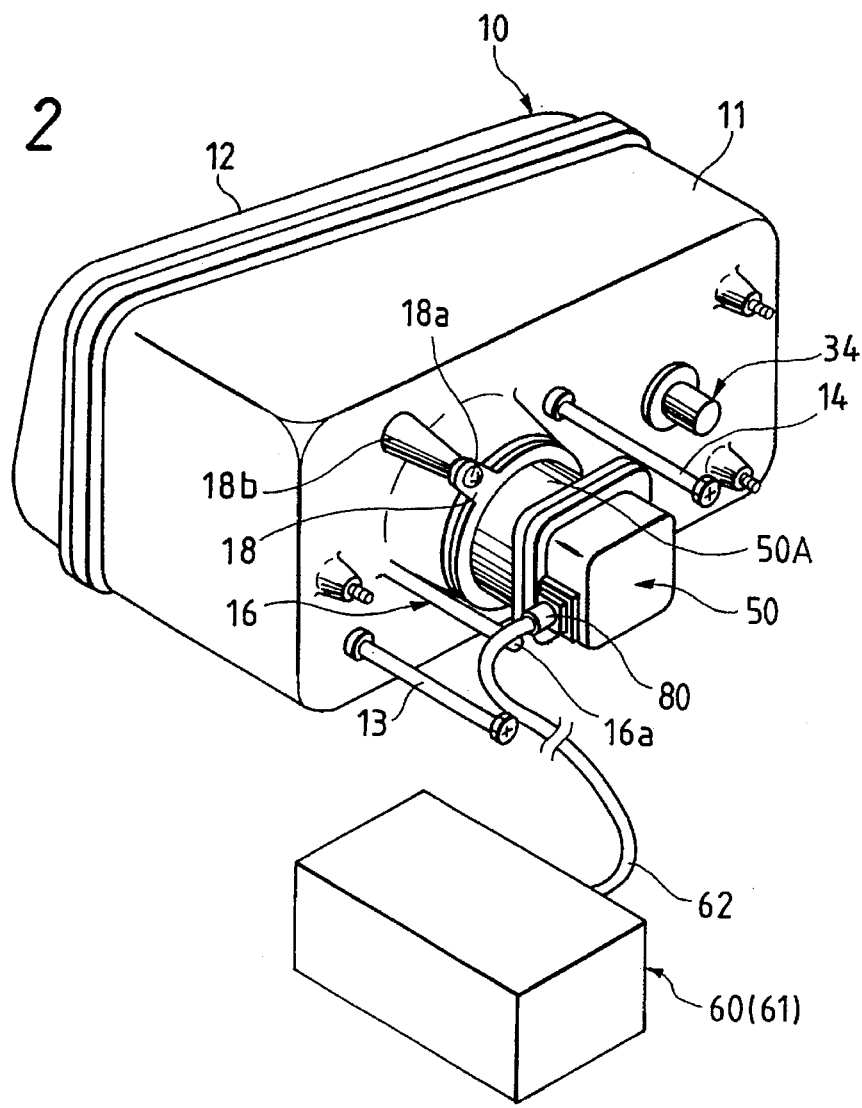
FIG. 2 is a perspective view showing a headlamp for a motor vehicle constructed according to a preferred embodiment of the present invention.
Figure 3:
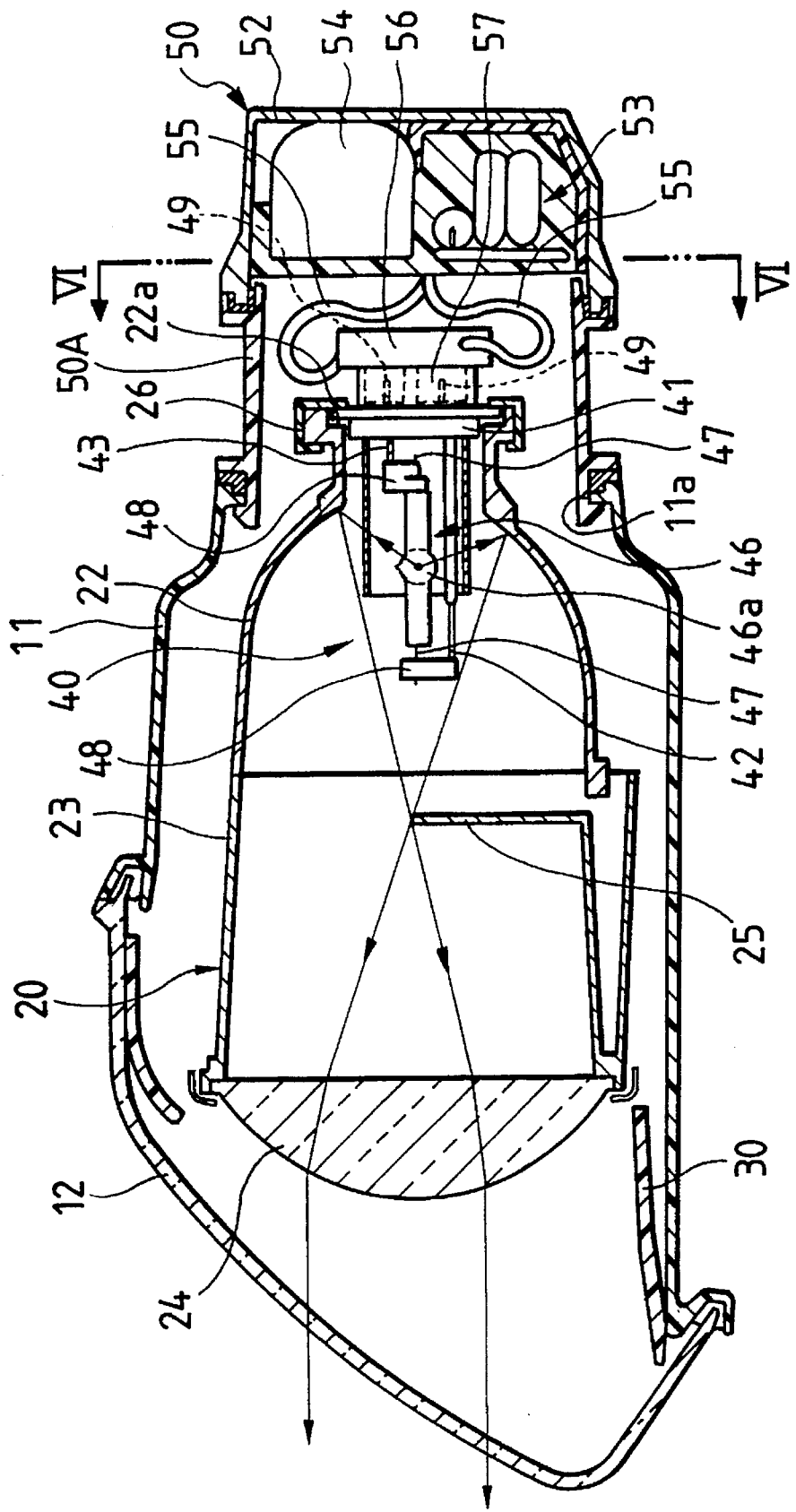
FIG. 3 is a longitudinal sectional view showing the headlamp.
Figure 4:
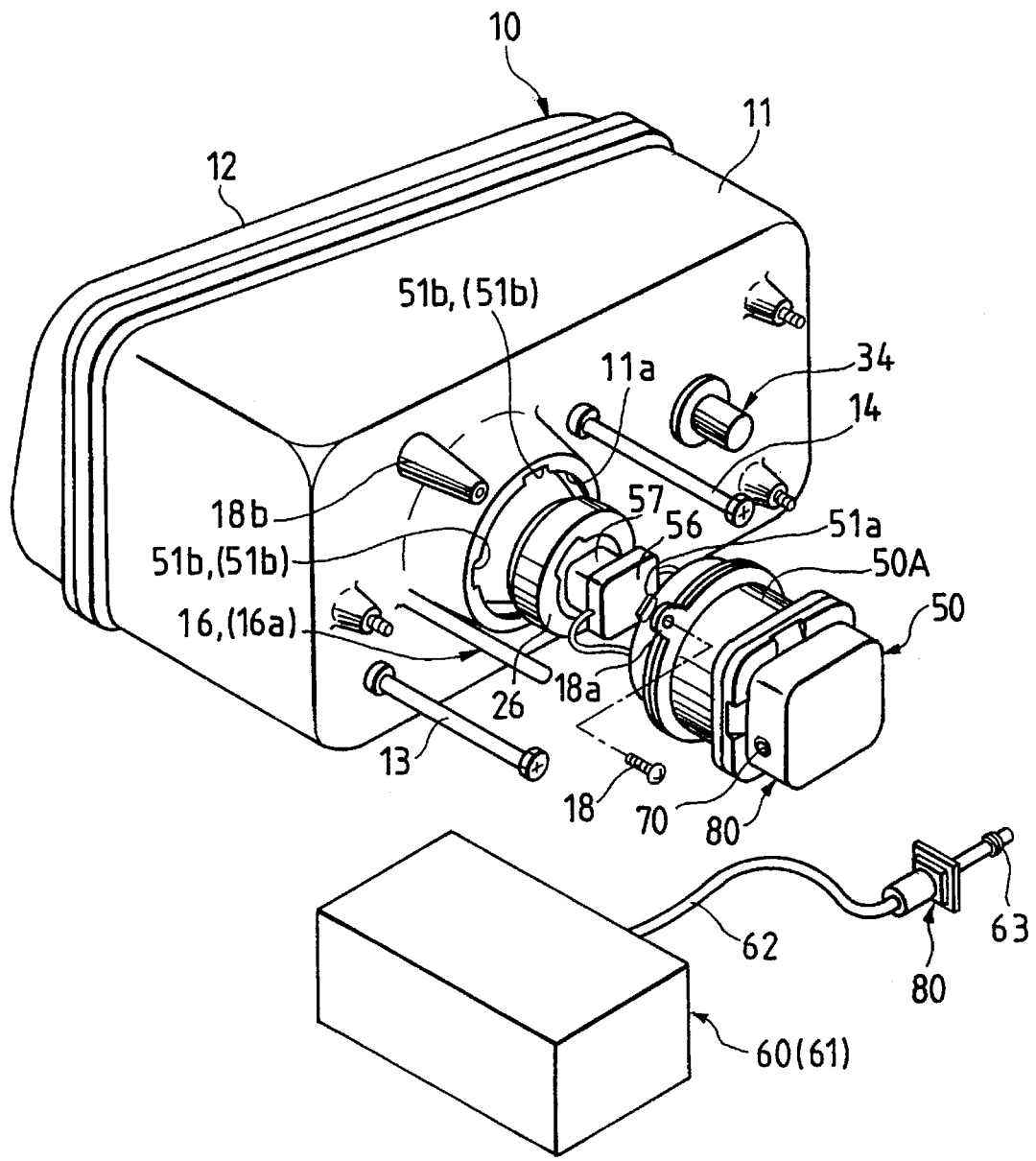
FIG. 4 is an exploded view showing the headlamp in a state where an actuator circuit unit has been removed.
Figure 5:
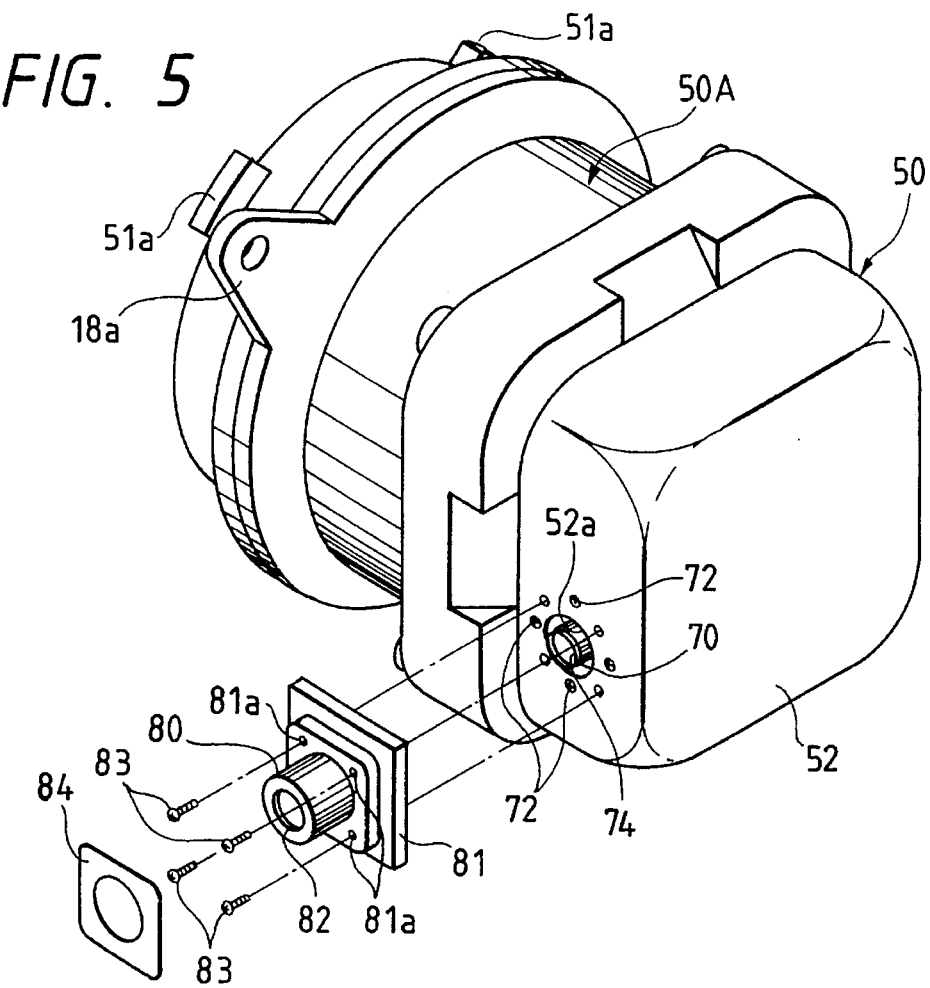
FIG. 5 is an exploded view in perspective of the structure of the headlamp near a receptacle as a connector connection portion.
Figure 6:
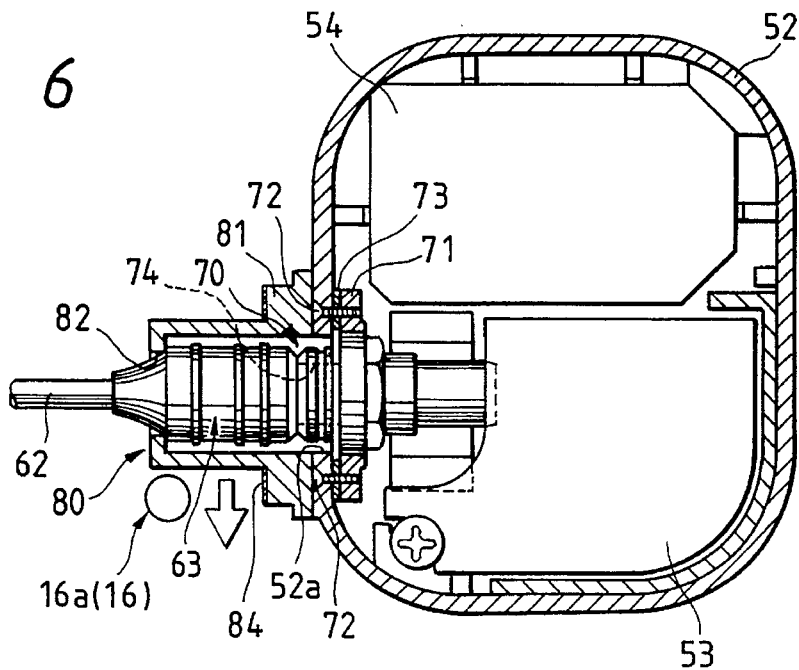
FIG. 6 is a cross-sectional view showing the receptacle as a connector connection portion when it receives a connector.
Figure 7:
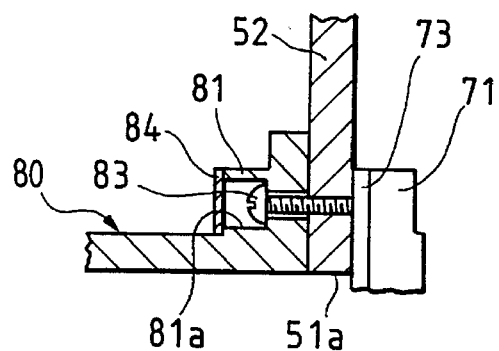
FIG. 7 is a cross-sectional view showing a blind sealing portion.

FIGS. 2 to 7 show a first embodiment of the present invention. Of these figures, FIG. 2 is a perspective view showing a headlamp for a motor vehicle according to a first preferred embodiment of the present invention, FIG. 3 is a longitudinal sectional view showing the headlamp, FIG. 4 is an exploded view showing the headlamp in a state where an actuator circuit unit has been removed, FIG. 5 is an exploded view in perspective of the structure of the headlamp near a receptacle as a connector connection portion, FIG. 6 is a cross-sectional view showing the receptacle as a connector connection portion when it receives a connector, and FIG. 7 shows a cross-sectional view showing a blind sealing portion.

In these figures, reference numeral 10 designates a headlamp for a motor vehicle. In the headlamp 10, a front lens 12 is fastened to the front opening of a capsule-like lamp body 11, thereby defining a lamp chamber. Within this lamp chamber, a projection unit 20 constituting a headlamp body is mounted in such a manner that it is vertically and horizontally tiltable with respect to the lamp body 11 by means of an aiming mechanism (constructed of two aiming screws 13 and 14, and a single ball-and-socket joint).

In the construction of the projection unit 20, a substantially elliptical reflector 22 and a lens holder 23 for supporting a projection lens 24 are assembled in a one-piece construction. A discharge bulb 40 is firmly inserted into a bulb receiving hole 22a of the reflector 22.

Light emitted from a discharge part 46a of an arc tube 46 of the discharge bulb 40 is reflected by the reflector 22 and projected into a space in front of the vehicle by the projection lens 24. Reference numeral 25 designates a shade for forming a clear cut line, and reference numeral 26, a locking cap for fastening the discharge bulb 40 to the bulb receiving hole 22a. Reference numeral 30 indicates a cover provided around the projection unit 20. The cover 30 is made of synthetic resin, and aluminum is deposited on the surface of the cover 30. A reflector (not shown) for the clearance lamp, which is integral with the cover 30, is provided on the side of the cover 30. A bulb 34 (FIG. 2) for the clearance lamp is firmly inserted into the reflector.

For the discharge bulb 40, the arc tube 46 is supported by a pair of long and short lead supports 42 and 43 protruding from the front of an insulating base 41. A pair of oppositely disposed electrodes are located within the discharge part 46a of the arc tube 46. Lead wires 47, which are connected to the pair of electrodes, extend from the arc tube, and are welded to respective metal support members 48 supported by the lead supports 42 and 43. A male connector 57, having terminals 49 protruding therefrom and which is connected to the lead supports 42 and 43, is formed at the rear end of the discharge bulb 40.

A circular opening portion 11a, which is used for mounting an actuator circuit unit and for inserting/removing the bulb, is formed on the rear side of the lamp body 11. A tubular extended portion 50A, which is fixed to the front end of an actuator circuit unit 50, is removably fastened to the circular opening portion 11a in a bayonet fashion. A bayonet coupling structure is composed of bayonet portions 51a formed on the outer circumference of the front end of the tubular extended portion 50A, and engaging grooves 51b formed in the inner circumference of the circular opening portion 11a. When the bayonet portions 51a are aligned with the guides $51b_1$ of the engaging grooves 51b, and the unitary assembly of the actuator circuit unit 50 and tubular extended portion 50A is turned clockwise, whereupon the tubular extended portion 50A of the actuator circuit unit comes into engagement with and is fastened to the circular opening portion 11a of the lamp body in a bayonet fashion. When the unitary construction thus fastened to the circular opening portion is turned counterclockwise, the bayonet portions 51a disengages from the circular opening portion, and is pulled out of the guides 51b1. In this way, the unitary assembly of the actuator circuit unit 50 and tubular extended portion 50A is removed from the circular opening portion 11a of the rear side of the lamp body.

Reference numeral 18 designates a screw for fixing a bracket 18a, which extends outward from the tubular extended portion 50A, to a boss 18b of the lamp body 11. The screw 18 is used for preventing the unitary assembly of the actuator circuit unit 50 and tubular extended portion 50A, which is fastened to the circular opening portion 11a in a bayonet fashion, from being separated from the circular opening portion.

The actuator circuit is used primarily for starting the lighting of the discharge bulb 40 by applying a high voltage to the discharge bulb 40. Components required for the actuator circuit, such as a printed circuit board 53 having electronic devices thereon and a transformer 54, are contained in a case 52 and molded with resin to form an actuator circuit unit 50 as a single unit.

An output cord 55 extends from the actuator circuit unit 50. A female connector 56 attached to the end of the output cord receives the male connector 57 of the rear end of the discharge bulb 40, whereby the actuator circuit unit 50 is connected to the discharge bulb 40. A receptacle 70 of a connector connection portion is formed in one of the sides of the case for the actuator circuit unit 50. A connector 63 attached to the end of an output cord 62, which extends from a ballast circuit unit 60, is inserted into the receptacle 70, whereby the ballast circuit unit 60 is connected to the actuator circuit unit 50. For the ballast circuit unit 60, a ballast circuit (not shown) is set in a case 61 and constructed into a unitary construction to form the ballast circuit unit 60. This ballast circuit is required for causing the discharge bulb 40 to continue a stable discharge.

The receptacle 70 is provided with a flange 71. As shown in FIGS. 5 and 6, the flange 71 is fastened to the inner fringe of a receptacle mounting opening 52a of the case 52 by means of four screws 72. The receptacle 70, which is a connector connection portion, is exposed to outside through the opening 52a. Reference numeral 73 designates a packing. The receptacle 70 includes a recess 74 which receives the connector 63. A terminal, which corresponds to the connector terminal, is formed in the recess 74. With this structure of the receptacle 70, the connector 63 may easily be inserted into and removed from the receptacle 70. A protector 80 for preventing the connector from slipping off is fastened to the fringe of the opening 52a, which surrounds the receptacle 70, by means of screws 83. The protector 80, which is in the form of a cup-like tubular member with a flange, has a cord insertion hole 82 formed passing therethrough. Screw receiving portions 81a of a flange 81 are worked to have spot facing. When screws are inserted into the screw receiving portions 81a, the screw heads do not project above the surface of the flange 81. A blind seal 84 is attached to the flange 81 by bonding, so that the heads of the screws 83 do not appear on the protector 80 (FIG. 7). The diameter of the cord insertion hole 82 is smaller than that of the connector 63, thereby preventing the connector 63 from slipping from the receptacle.

Since an untrained user does not see any of the screws 83 on the outside of the protector, that is, since the connection structure of the connector 63 in the protector 80 cannot be ascertained at a casual glance, it is unlikely that such a user would attempt to pull the connector 63 out of the receptacle. However, a trained worker who knows the inner structure of the protector 80 can easily pull the connector out of the receptor by removing the blind seal 84 from the flange and loosening the screws 83.

A rib 16 extends from the rear wall of the lamp body near the circular opening portion 11a up to a location confronting the outer side wall of the actuator circuit unit 50, more exactly, to a location where it comes in contact with the protector 80 attached to the outer side wall when the actuator circuit unit 50 is turned counterclockwise. Thus, the rib 16 functions as a member for blocking the rotation of the actuator circuit unit 50. The rib 16 is integral with the lamp body 11. The top end 16a of the rib 16 reaches the protector 80 (FIG. 6). When the actuator circuit unit 50 is turned counterclockwise (in the removal direction), the protector 80 comes in contact with the rib 16, thereby preventing the actuator circuit unit 50 from being further turned.

To be more specific, in a situation where the actuator circuit unit 50 is removed for bulb exchange purposes with the output cord 62 connected to the actuator circuit unit 50, a high voltage of approximately 20 KV is induced to the connector 63 at the time of removing the connector. This is very dangerous to the person engaging in the bulb exchange work. To avoid this dangerous state of high voltage generation, the headlamp of the invention is constructed so as to inhibit bulb exchange until the power supply to the actuator circuit unit 50 is stopped. In other words, removal (by rotation) of the actuator circuit unit 50, which is preliminary to removal of the connector 63, is prevented unless the output cord 62 is removed and the actuator circuit unit is shut off. In the state where the protector 80 is removed and the connector 63 is pulled out of the receptacle 70, no current is fed to the actuator circuit unit 50. Accordingly, the bulb exchange work can safely be performed. In this state, the actuator circuit unit 50 can be turned counterclockwise (in the removal direction), not hitting the rib 16, and removed from the lamp body. Thus, in the inventive headlamp, the actuator circuit unit 50 cannot be removed from the lamp body, i.e., the bulb exchange work cannot be carried out, until the connector 63 is pulled out of the actuator circuit unit 50.

Figure 8:
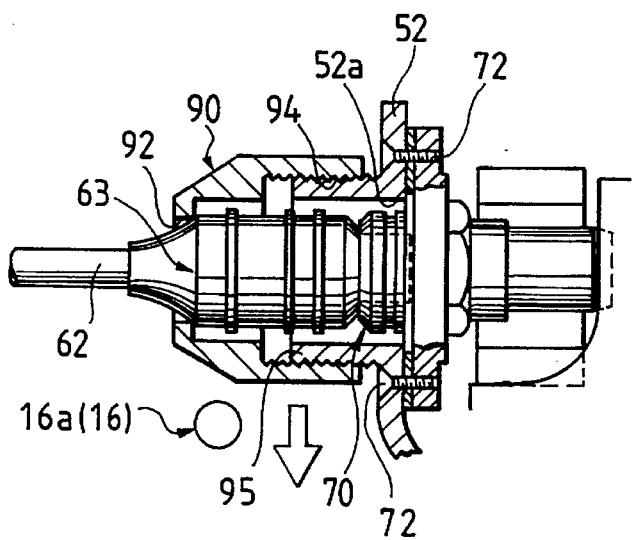
FIG. 8 is an enlarged sectional view showing a receptacle and the structure near a connector as a key portion of a second embodiment of the present invention.

FIG. 8 is an enlarged sectional view showing a receptacle and the structure near a connector, which are key portions of a second embodiment of the present invention. Reference numeral 90 designates a protector for preventing the connector from slipping off. The protector 90 is a cup-like tubular member with a cord insertion hole 92. A part of the inner surface of the protector is threaded to form a left-hand female screw 94. The protector 90 is screwed onto a tubular portion 95 protruding from the circumferential edge of the opening 51a. The threaded portions of the protector 90 and the tubular portion 95 are left-hand screw threads. When the protector 90 is turned clockwise, it is loosened. The untrained user would thus find it difficult to remove the protector 90. However, trained workers aware of the use of the left-hand screws can easily remove the protector 90 and pull the connector 63 out of the receptacle.

The top end 16a of the rib 16 reaches a location confronting the side wall of the protector 90. With the provision of the rib 16, the actuator circuit unit 50 cannot be turned counterclockwise (in the removal direction) until the power supply to the actuator circuit unit has completely been stopped.

Figure 9:
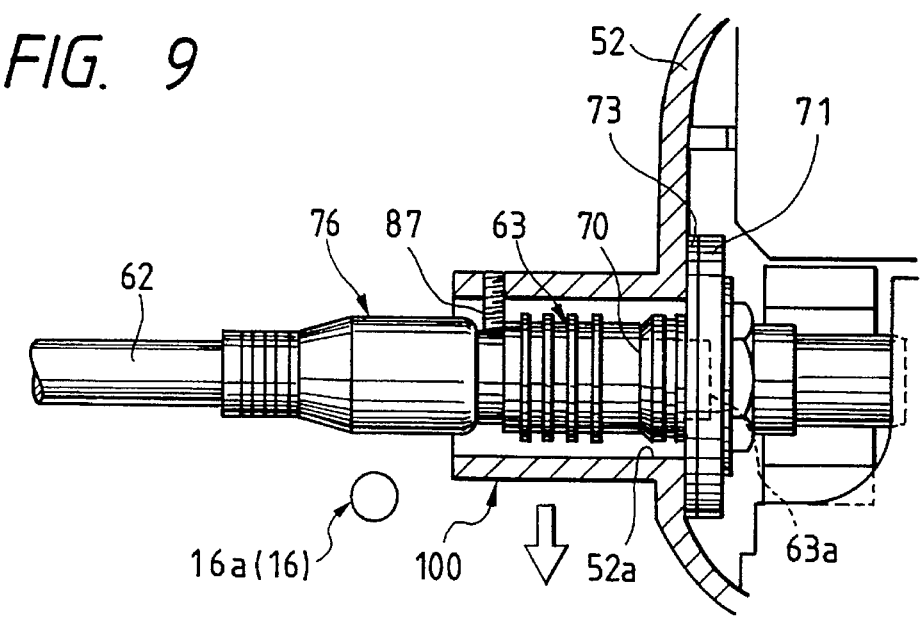
FIG. 9 is an enlarged sectional view showing a receptacle and the structure near a connector as a key portion of a third embodiment of the present invention.

FIG. 9 is an enlarged sectional view showing a receptacle and the structure near a connector as a key portion of a third embodiment of the present invention.

In this embodiment, a screw 87, which serves as a stopper for preventing a release 76 from retractively sliding, is provided in the side wall of the tubular portion forming a protector 100 so as to prevent the connector 63 from slipping off. The head of the screw 87 is cut off after the screw is inserted into the tubular portion. Therefore, removal of the screw 87 is very difficult, and there is little chance that a user would t5 inadvertently pull out the connector 63.

The top end 16a of the rib 16 is located under the release 76 that is attached to the end of the output cord 62. With the provision of the rib 16, the actuator circuit unit 50 cannot be turned counterclockwise (in the removal direction) until the connector 63 is removed from the receptacle 74.

In the above-described embodiments, the rib 16 protruding from the rear wall of the lamp body is used for preventing the removal turn of the actuator circuit unit 50. The same effect may be achieved by locating the aiming screws 13 and 14, which protrude rearward from the lamp body, at positions where the screws come in contact with the connector 63 (protectors 80, 90, and 100) or the output cord 62.

As seen from the foregoing description, when the actuator circuit unit is turned in the removal direction in the state where the output cord from the actuator circuit unit is still connected to the actuator circuit unit, the connector that is inserted into the connector connection portion comes in contact with the rotation blocking member to prevent the further turning of the actuator circuit unit. Thus, the danger associated with exchanging the bulb when power is applied to the bulb is substantially eliminated. However, once the output cord from the ballast circuit unit has been removed from the actuator circuit unit, the bulb exchange work can be performed without any danger of electric shock. Further, the actuator circuit unit is not blocked in turning by the rotation blocking member. Accordingly, a user can remove the actuator circuit unit by turning it and exchange the old bulb with a new one.

What is claimed is:

1. A vehicular headlamp of a discharge type for emitting light in a frontward direction, comprising:

a lamp body having a mounting hole formed in a rearwardly disposed wall thereof;

a discharge bulb housed within said lamp body;

an actuator circuit unit assembly, comprising an actuator circuit unit, coupled to a rear wall of said lamp body and protruding rearward of said lamp body, and a connector for connecting an actuator circuit of said unit to said discharge bulb, said actuator circuit unit assembly being removable from said lamp body by rotating said actuator circuit unit assembly with respect to said body;

a ballast circuit unit located close to said lamp body;

a first output cord having two distal ends and being connected at one distal end thereof to said ballast circuit unit and at other distal end thereof to said actuator circuit, said output cord being removable from said actuator circuit; and means, comprising a structure protruding rearwarly from the lamp body, for preventing said actuator circuit unit assembly from rotating in a removal direction while said first output cord is attached to said actuator circuit.

2. The vehicular headlamp of claim 1, wherein said actuator circuit unit assembly further comprises a tubular extended portion coupled between said actuator circuit unit and said lamp body.

3. The vehicular headlamp according to claim 2, further comprising a bayonet coupling structure for coupling said actuator circuit unit assembly and said lamp body to each other said bayonet coupling structure comprising a plurality of bayonet portions formed on an outer circumference of a front end of said tubular extended portion, engaging grooves for engaging said bayonet portions being formed in an inner circumference of a circular opening portion of said rear wall of said lamp body.

4. The vehicular headlamp according to claim 1, wherein said actuator circuit unit assembly and said lamp body are coupled to each other by rotating said actuator circuit unit assembly clockwise with respect to said lamp body, and removed by rotating said actuator circuit unit assembly counterclockwise.

5. The vehicular headlamp according to claim 2, wherein said lamp body comprises a boss, and said tubular extended portion comprises a bracket extending outwardly therefrom, said bracket being fixed to said boss by a screw.

6. The vehicular headlamp according to claim 1, wherein said actuator circuit unit comprises a printed circuit board molded by resin to form a single unit.

7. The vehicular headlamp according to claim 1, comprising a second output cord having two distal ends, wherein said connector comprises a female connector coupled to one distal end of said second output cord and a male connector coupled to a rear end of said discharge bulb.

8. The vehicular headlamp according to claim 7, wherein said actuator circuit unit comprises a receptacle formed on a side surface thereof and said second output cord comprises a connector at the other distal end which is inserted into said receptacle.

9. The vehicular headlamp according to claim 8, further comprising a cylindrical protector for covering a connecting portion of said second output cord proximate to said actuator circuit unit.

10. The vehicular headlamp according to claim 9, further comprising a first flange disposed within said actuator circuit unit at the connecting portion of said second output cord, wherein said protector has a cord insertion hole and comprises a second flange secured to said first flange.

11. The vehicular headlamp according to claim 10, wherein said first flange and said second flange are secured to each other by screws.

12. The vehicular headlamp according to claim 1, wherein said rotating prevention means comprises a rib extending from said rear wall of said lamp body to a location proximate to an outer side wall of said actuator circuit unit assembly.

13. The vehicular headlamp according to claim 1, wherein said rotation preventing means comprises an aiming screw protruding rearward from said lamp body.

* * * * *